(12) United States Patent
Ito et al.

(10) Patent No.: US 9,241,303 B2
(45) Date of Patent: Jan. 19, 2016

(54) MOBILE STATION AND METHOD

(75) Inventors: Makoto Ito, Chiyoda-ku (JP);
Kazufumi Yunoki, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 109 days.

(21) Appl. No.: 13/878,489

(22) PCT Filed: Nov. 15, 2011

(86) PCT No.: PCT/JP2011/076315
§ 371 (c)(1),
(2), (4) Date: Apr. 9, 2013

(87) PCT Pub. No.: WO2012/067121
PCT Pub. Date: May 24, 2012

(65) Prior Publication Data
US 2013/0196662 A1 Aug. 1, 2013

(30) Foreign Application Priority Data

Nov. 15, 2010 (JP) ................................. 2010-254877

(51) Int. Cl.
*H04W 4/00* (2009.01)
*H04W 48/18* (2009.01)
(52) U.S. Cl.
CPC .................... *H04W 48/18* (2013.01)
(58) Field of Classification Search
CPC ..... H04W 48/16; H04W 48/18; H04W 60/00; H04W 60/02; H04W 88/06
USPC .............. 455/435.1, 435.2, 435.3, 432.1, 434
See application file for complete search history.

(56) References Cited

U.S. PATENT DOCUMENTS

| 8,135,405 | B2 * | 3/2012 | Mittal et al. | 455/435.2 |
| 8,565,221 | B2 * | 10/2013 | Kodali et al. | 370/352 |
| 2005/0107082 | A1 | 5/2005 | Gunaratnam et al. | |
| 2005/0107109 | A1 | 5/2005 | Gunaratnam et al. | |
| 2008/0220773 | A1 * | 9/2008 | Buckley | 455/433 |
| 2009/0215447 | A1 * | 8/2009 | Catalano et al. | 455/432.1 |

(Continued)

FOREIGN PATENT DOCUMENTS

| EP | 1 638 357 A1 | 3/2006 |
| JP | 2007-28479 | 2/2007 |

(Continued)

OTHER PUBLICATIONS

Extended European Search Report issued Sep. 11, 2014, in European Patent Application No. 11840957.2.

(Continued)

*Primary Examiner* — Temica M Beamer
(74) *Attorney, Agent, or Firm* — Oblon, McClelland, Maier & Neustadt, L.L.P.

(57) ABSTRACT

A mobile station includes a public land mobile network registration unit that registers public land mobile networks including a public land mobile network input by a manual operation, wherein the public land mobile network input by the manual operation is not detected, and a public land mobile network selecting unit that selects a public land mobile network specified by the manual operation, among the public land mobile networks registered in the public land mobile network registration unit, wherein the public land mobile networks registered in the public land mobile network registration unit include the public land mobile network which is not detected.

12 Claims, 9 Drawing Sheets

(56) References Cited

U.S. PATENT DOCUMENTS

| | | |
|---|---|---|
| 2009/0325574 A1 | 12/2009 | Izawa et al. |
| 2010/0110987 A1* | 5/2010 | Subramanian et al. ....... 370/328 |
| 2010/0216465 A1* | 8/2010 | Mubarek et al. ........... 455/435.1 |
| 2010/0227641 A1 | 9/2010 | Muller |

FOREIGN PATENT DOCUMENTS

| | | |
|---|---|---|
| JP | 2007-511141 | 4/2007 |
| JP | 2007 129301 | 5/2007 |
| JP | 2008-258739 | 10/2008 |
| JP | 2009-141794 | 6/2009 |
| JP | 2010 11020 | 1/2010 |
| JP | 2010 81628 | 4/2010 |
| JP | 2010-98363 | 4/2010 |

OTHER PUBLICATIONS

"3rd Generation Partnership Project; Technical Specification Group Services and Systems Aspects; Review of Network Selection Principles"; Technical Report, Global System for Mobile Communications, (Release 7) 3GPP TR 22.8 11, No. V7.2.0, XP-050361367, pp. 1-15.

"3rd Generation Partnership Project; Technical Specification Group Core Network and Terminals; Non-Access-Stratum (NAS) functions related to Mobile Station (MS) in idle mode", Technical Specification, Global System for Mobile Communications, (Release 9) 3GPP TS 23.122, No. V9.4.0, XP-050442208, Sep. 27, 2010, pp. 1-41.

3GPP TS 23.122 V9.4.0, "3rd Generation Partnership Project; Technical Specification Group Core Network and Terminals; Non-Access-Stratum (NAS) functions related to Mobile Station (MS) in idle mode (Release 9)," Global System for Mobile Communications, pp. 10, 11, 18, 19, (Sep. 2010).

3GPP TS 23.122 V9.2.0, "3rd Generation Partnership Project; Technical Specification Group Core Network and Terminals; Non-Access-Stratum (NAS) functions related to Mobile Station (MS) in idle mode (Release 9)," Global System for Mobile Communications, pp. 1 to 41, (Mar. 2010).

International Search Report Issued Dec. 20, 2011 in PCT/JP11/76315 Filed Nov. 15, 2011.

Office Action issued May 5, 2015 in Chinese Patent Application No. 201180054535.1 (with English translation).

Office Action issued Sep. 3, 2013 in Japanese Patent Application No. 2010-254877 (with English translation).

* cited by examiner

MOBILE STATION AND METHOD

TECHNICAL FIELD

The present invention relates to a mobile station.

BACKGROUND ART

There are some mobile terminal devices which may be used in a country other than a contracted country. In a case where a mobile terminal device is allowed to be used in a country other than the contracted country, it is possible that a roaming agreement has been concluded between an operator in the contracted country and another operator in the country other than the contracted country. Radio communication systems provided by an operator may include a GSM (Global System for Mobile Communications) (registered trademark) system and a WCDMA (Wideband Code Division Multiple Access) system. Further, an LTE (Long Term Evolution) system may be included.

A mobile station operates on its home public land mobile network (PLMN: public land mobile network) or equivalent home PLMN. The mobile station selects a PLMN. Two types of selection methods, i.e., an automatic mode and a manual mode, are defined as operations for selecting the PLMN. In the automatic mode, a list of PLMNs in priority order is utilized. The highest priority PLMN among available and allowable PLMNs is selected. In the manual mode, the mobile station indicates available PLMNs to a user. Only when the user manually selects, the mobile station attempts to obtain a service in the selected PLMN.

A case is explained where a PLMN is selected in the automatic mode.

FIG. 1 shows an example of processes from the power-on of a mobile station until the location registration is performed.

The power supply of the mobile station is turned on (step S12).

The mobile station performs a cell search (step S14). The mobile station detects available frequency ranges and cells that are to be candidates for a serving cell. The cell search may be referred to as a "band search."

The mobile station performs PLMN selection (step S16). The mobile station selects a PLMN that is available for the mobile station among the cells that are detected at step S14. For example, a USIM (Universal Subscriber Identity Module) card is attached to the mobile station. The USIM card stores a telephone number for which a contract has been established with an operator; and a priority order to be recorded by the operator, which is for establishing a connection with another operator's PLMN. When a PLMN is to be selected in accordance with the priority order, for PLMNs having the same priority order, the mobile station selects the PLMN randomly from the PLMNs whose electric field strengths are greater than or equal to a predefined value. Further, when there are no PLMNs whose electric field strengths are greater than or equal to the predefined value, the mobile station selects the PLMN in accordance with a descending order of signal levels.

The mobile station performs cell selection (step S18). The mobile station detects candidate cells which are available to the mobile station, based on broadcast information from the PLMN which is selected at step S16.

The mobile station performs location registration (step S20). The mobile station selects a cell to which the location registration is to be performed among the cells detected at step S18. Then the mobile station performs the location registration to the selected cell.

A case is explained where a PLMN is selected in the manual mode.

Irrespective of whether the operation mode is the manual mode or the automatic mode, when the power supply of the mobile station is turned on, or when the mobile station returns from an out-of-coverage state, the PLMN is selected to which the location registration has been performed at a previous time. In the automatic mode, for a case where there are no PLMNs to which the location registration has been performed at the previous time, another PLMN is automatically selected. In the manual mode, after that, it is possible for a user to manually select another PLMN.

In the manual mode, for selecting the PLMN, only the detected PLMNs are displayed in a list, and the user selects one PLMN from the list. It is not possible to select PLMNs that are not detected.

RELATED ART DOCUMENT

Non-Patent Document

Non-Patent Document 1: 3GPP TS23.122 V9.2.0, 2010 03

SUMMARY OF THE INVENTION

Problem to be Solved by the Invention

The 3GPP standard defines a selection process for selecting a PLMN, in which a mobile station is to be served, in a contracted country.

However, a process is not defined for the mobile station to select a PLMN in a country other than the contracted country. For example, the mobile station randomly selects a PLMN, to which the mobile station is to be connected. When the PLMN to be connected to is randomly selected and the PLMN serves, it is not always true that the communication quality in the PLMN is good.

Alternatively, for example, a network may be manually selected by operating the mobile station. However, for a case where the network has been manually selected, and subsequently the mobile station returns to the contracted country, location registration may not be automatically performed to a PLMN other than the registered PLMN to which location registration has been previously performed in a country other than the contracted country or to an Equivalent PLMN which is equivalent to the registered PLMN. Accordingly, a user may be required to select the HPLMN in the contracted country by the manual operation. Subsequent to selecting the network by the manual operation, when the user switches the operation mode to the automatic mode, location registration to a different PLMN is possible.

The present invention has been achieved in view of the above-described problem. An objective of the present invention is to enable automatic selection of home network, when the mobile station returns to the contracted country after international roaming.

Means for Solving the Problem

A mobile station includes a public land mobile network registration unit that registers public land mobile networks including a public land mobile network input by a manual operation, wherein the public land mobile network input by the manual operation is not detected; and a public land mobile network selecting unit that selects a public land mobile network specified by the manual operation, among the public land mobile networks registered in the public land mobile network registration unit, wherein the public land mobile networks registered in the public land mobile network registration unit include the public land mobile network which is not detected.

A mobile station is a mobile station that detects a predetermined public land mobile network, when a different public land mobile network other than the predetermined public land mobile network is selected by a manual operation.

The mobile station includes a public land mobile network detecting unit that detects, when a power supply is turned on, the predetermined public land mobile network, prior to specifying a public land mobile network by the manual operation; and a public land mobile network selecting unit that automatically selects the predetermined public land mobile network detected by the public land mobile network detecting unit.

A mobile station is a mobile station that detects a predetermined public land mobile network, when a different public land mobile network other than the predetermined public land mobile network is selected by a manual operation.

The mobile station includes a public land mobile network detecting unit that periodically detects the predetermined public land mobile network, when coverage is lost; and a public land mobile network selecting unit that automatically selects the predetermined public land mobile network detected by the public land mobile network detecting unit.

A mobile station detects a predetermined public land mobile network, when a different public land mobile network other than the predetermined public land mobile network is selected by a manual operation.

The mobile station includes a public land mobile network detecting unit that detects the predetermined public land mobile network, when the different public land mobile network other than the predetermined public land mobile network is selected by the manual operation in a first country other than a second country corresponding to the predetermined public land mobile network; and a public land mobile network selecting unit that automatically selects the predetermined public land mobile network detected by the public land mobile network detecting unit.

A mobile station includes a public land mobile network detecting unit that detects a specific public land mobile network, wherein the specific public land mobile network is not detected, when a public land mobile network is selected by the manual operation; and a public land mobile network selecting unit that automatically selects the public land mobile network detected by the public land mobile network detecting unit.

A method includes a public land mobile network registration step of registering public land mobile networks including a public land mobile network input by a manual operation, wherein the public land mobile network input by the manual operation is not detected; and a public land mobile network selecting step of selecting a public land mobile network specified by the manual operation, among the public land mobile networks including the public land mobile network which is not detected, wherein the public land mobile networks including the public land mobile network which is not detected are registered by the public land mobile network registration step.

A method is a method of a mobile station that detects a predetermined public land mobile network, when a different public land mobile network other than the predetermined public land mobile network is selected by a manual operation.

The method includes a public land mobile network detecting step of detecting, when a power supply is turned on, the predetermined public land mobile network, prior to specifying a public land mobile network by the manual operation; and a public land mobile network selecting step of automatically selecting the predetermined public land mobile network detected by the public land mobile network detecting step.

A method is a method of a mobile station that detects a predetermined public land mobile network, when a different public land mobile network other than the predetermined public land mobile network is selected by a manual operation.

The method includes a public land mobile network detecting step of periodically detecting, when coverage is lost, the predetermined public land mobile network; and a public land mobile network selecting step of automatically selecting the predetermined public land mobile network detected by the public land mobile network detecting step.

A method is a method of a mobile station that detects a predetermined public land mobile network, when a different public land mobile network other than the predetermined public land mobile network is selected by a manual operation.

The method includes a public land mobile network detecting step of detecting the predetermined public land mobile network, when the different public land mobile network other than the predetermined public land mobile network is selected by the manual operation in a first country other than a second country corresponding to the predetermined public land mobile network; and a public land mobile network selecting step of automatically selecting the predetermined public land mobile network detected by the public land mobile network detecting step.

A method includes a public land mobile network detecting step of detecting a specific public land mobile network which is not detected, when a public land mobile network is selected by a manual operation; and a public land mobile network selecting step of automatically selecting the public land mobile network detected by the public land mobile network detecting step.

Effect of the Present Invention

According to the disclosed embodiments, when the mobile station returns to the contracted country after the international roaming, the home network can be automatically selected.

EMBODIMENTS FOR CARRYING OUT THE INVENTION

Figure 1:
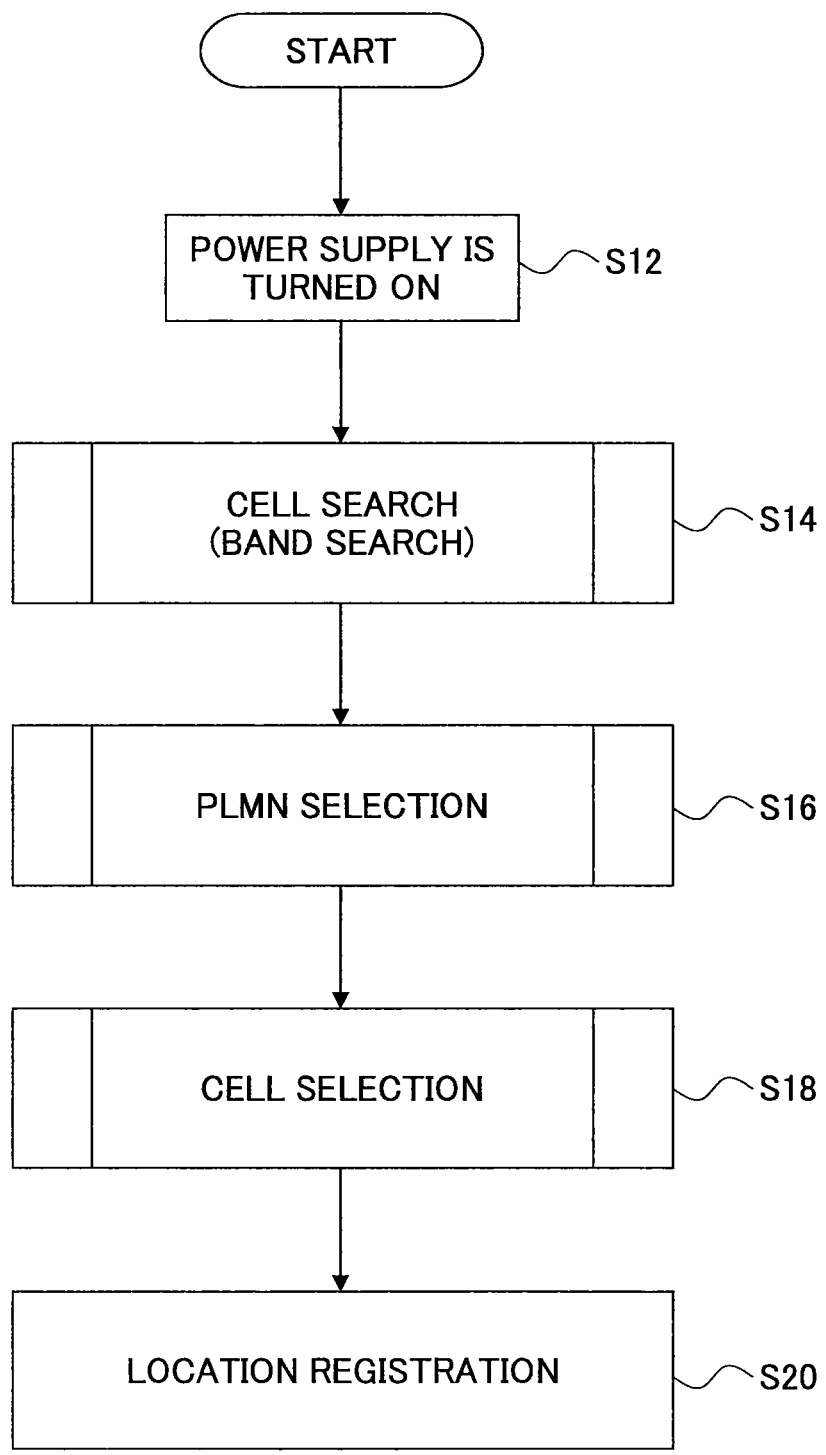
FIG. 1 is a flowchart showing an example of processes until location registration.

There is explained a configuration for implementing the present invention based on the following embodiment, while referring to the figures. Here, in all the figures for explaining the embodiment, repeated explanations are omitted by using the same reference numerals for elements having the same functions.

Embodiment

<System>

A system is explained for which a mobile station 100 according to the embodiment is adopted.

Figure 2:
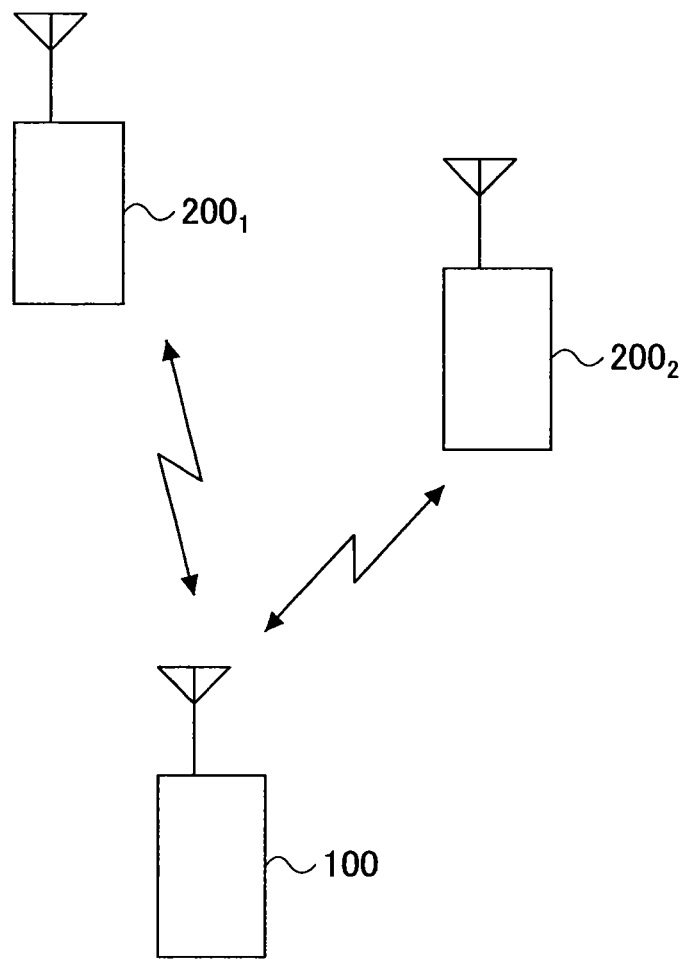
FIG. 2 is a diagram illustrating an example of a system where a mobile station according to an embodiment is adopted.

FIG. 2 shows an example of the system for which the mobile station 100 is adopted.

The system includes the mobile station 100. The system includes base stations $200_m$ (m is an integer such that m>0). FIG. 2 shows, as an example, a case where m=2. Each telecommunications carrier among at least two telecommunication carriers (hereinafter, which are referred to as "operators") operates some of the plural base stations $200_m$. For example, the base station $200_1$ and the base station $200_2$ are operated by different operators. For example, mobile country codes (MCC: Mobile Country Code) may be the same for the at least two operators that operate PLMNs to which the corresponding base stations $200_m$ belong, but mobile network codes (MNC: Mobile Network Code) may be different. Alternatively, for example, the mobile country codes may be different for the at least two operators that operate the PLMNs to which the corresponding base stations $200_m$ belong. The base stations $200_m$ may be located in corresponding different countries.

Hereinafter, as an example, a case is explained where the base stations $200_m$ are located in the corresponding different countries. In the example shown in FIG. 2, the base station $200_1$ is located in a contracted country, and the base station $200_2$ is located in a country other than the contracted country. Hereinafter, the terms "network" and "PLMN" may be used as synonyms.

<Mobile Station>

Figure 3:
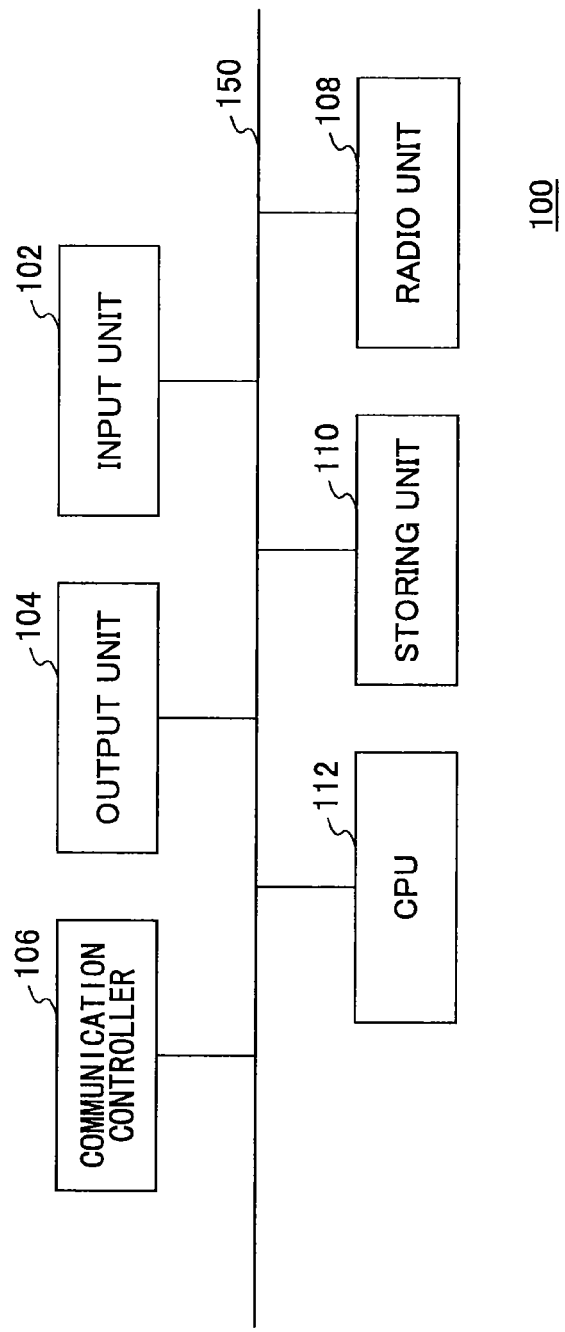
FIG. 3 is a configuration diagram showing an example of hardware representing the mobile station according to the embodiment.

FIG. 3 shows the mobile station 100 according to the embodiment. FIG. 3 mainly shows a hardware configuration.

The mobile station 100 includes an input unit 102; an output unit 104; a communication controller 106; a radio unit 108; a storing unit 110; and a central processing unit 112. The functional blocks are connected by a bus 150. In the embodiment, the mobile station 100 is explained as an example. However, the configuration may be applied not only to the mobile station 100, but also to a terminal device, as long as the terminal device is capable of international roaming. For example, the configuration can be applied to a personal digital assistant (PDA: Personal Digital Assistant).

The central processing unit 112 performs control of the input unit 102, the output unit 104, the communication controller 106, the radio unit 108, and the storing unit 110. The central processing unit 112 operates in accordance with a program stored in the storing unit 110, and performs predetermined processes.

The storing unit 110 stores an application and an operating system (OS: Operating System). The application is software that includes a function to execute tasks that are performed by a user through the mobile station 100. The operating system is software that provides, in the mobile station 100, application software with an interface that abstracts hardware.

The input unit 102 includes a keyboard and a mouse, for example. The input unit 102 is a device for inputting an instruction to the mobile station 100 and data. Additionally, the input unit 102 includes a microphone, for example. The input unit 102 inputs a voice from a user. The voice may include an instruction to the mobile station 100. The instruction includes an instruction to the operating system and an instruction to the application.

The output unit 104 includes a display, for example. The output unit 104 indicates a processing state of the mobile station 100 and a processing result by the mobile station 100. Further, the output unit 104 may include a speaker, for example, and the output unit 104 may output a sound to a user. The processing state and the processing result include those by the operating system and the application. The display includes a liquid crystal display (Liquid Crystal Display: LCD), a CRT (Cathode Ray Tube) display, a plasma display (PDP: Plasma Display Panel), and an organic electroluminescence (Electro-Luminescence) display, for example.

The communication controller 106 generates control information for connecting the mobile station 100 to a network to be connected. The communication controller 106 also analyzes control information transmitted from a base station to be connected. Further, the communication controller 106 performs a frequency range measurement based on a signal to be received by the radio unit 108. The frequency range measurement may be referred to as a frequency range search (retrieval), or a cell search.

The radio unit 108 performs radio communication based on a predetermined radio communication scheme with the base station $200_m$ in accordance with the control of the central processing unit 112. The radio communication scheme includes the GSM (registered trade mark) scheme and the W-CDMA scheme. Further, the LTE scheme and a radio communication scheme according to a next generation of LTE may be included. For example, the radio unit 108 converts the control information generated by the communication controller 106 into a radio signal and transmits it. Further, the radio unit 108 converts a radio signal from the base station $200_m$ into a baseband signal.

<Mobile Station>

For a case where a network of a country other than a contracted country is selected by designating it through a manual operation, a mobile station 100 according to related art may not automatically switch to a different PLMN other then the Equivalent PLMN. Here, the network of the country other than the contracted country is other than a network for which a contract has been established in the contracted country. Accordingly, when the mobile station returns from the country other than the contracted country to the contracted country, the mobile station may not automatically switch to the home PLMN. In addition, for selecting the PLMN by the manual operation, PLMNs which currently do not exist and are not detected may not be selected.

Whereas, for a case where the network selection is performed by the manual operation, the mobile station 100 can register any PLMNs including the PLMNs which currently do not exist and are not detected. The mobile station 100 can designate a desired PLMN among any of the PLMNs including the PLMNs which currently do not exist and are not detected. Further, for the case where the network selection is performed by the manual operation, any of the PLMNs including the PLMNs which currently do not exist and are not detected can be registered, so that they can be used for the subsequent selections. Further, for a case where the network selection has been performed by the manual operation during international roaming, and subsequently the mobile station 100 returns to the contracted country, the mobile station 100 automatically selects the home network, without manually selecting the network by the manual operation.

Processes performed by the mobile station 100 includes a process of determining whether a mobile country code stored in a card which is inserted in (attached to) the mobile station 100 coincides with a mobile country code included in a broadcast channel received by the mobile station 100. The card is an IC card in which subscriber information is recorded. It may be a USIM. Hereinafter, as an example, a case is shown where the USIM card is inserted. The card may be called by a name other than the USIM.

Further, the processes performed by the mobile station 100 includes a process of selecting a network which is selected by the manual operation when the mobile country code stored in the USIM card inserted in the mobile station 100 does not coincide with the mobile country code included in the broadcast channel.

The processes performed by the mobile station 100 include a process of automatically selecting the home network when the mobile country code stored in the USIM card inserted in the mobile station 100 coincides with the mobile country code included in the broadcast channel.

<Home Network Selection Method (Version 1)>

During selection of a network by the manual operation, the mobile station 100 can register PLMNs which are not detected. Here the PLMNs include PLMNs in foreign countries, which are currently not detected. The user can manually select the network among the PLMNs which are not detected. During selection of the PLMN, the coverage of the PLMN may not be detected. Only the PLMNs which are not detected may be registered. Further, subsequent to confirming the PLMN which is detected by the manual operation, registration or selection of the PLMN may be performed, depending on necessity. The registration and the selection of the PLMNs, which are not detected, may be simultaneously performed. For a case where the registered PLMN is included in the detected PLMNs, displaying of the PLMN may be overlapped, or detection of the PLMN may be displayed.

<Home Network Selection Method (Version 2)>

For a case where the PLMN has been manually selected when the power supply is turned on, the mobile station 100 searches for the network, for which the contract has been established in the contracted country. The network may be searched for, while including the Equivalent PLMN of the network, for which the contract has been established. The network, for which the contract has been established in the contracted country, may be searched for, only if there is no coverage of the PLMN which has already been manually selected at the time at which the power supply is turned on. However, when the PLMN, which has not been detected and which is currently not detected, has already been manually selected, the network, for which the contract has been established in the contracted country, may not be searched for. The manual mode may be maintained, subsequent to the selection of the network, for which the contract has been established in the contracted country. Even if the network, for which the contract has been established in the contracted country, is not detected as a result of performing the search, the network may be selected, for which the contract has been established in the contracted country.

<Home Network Selection Method (Version 3)>

In a country other than the contracted country, the mobile station 100 selects a network of the country other than the contracted country. Here, the network of the country other than the contracted country is a network other than the network, for which the contract has been established in the contracted country. Subsequently, when the mobile station 100 returns to the contracted country, the mobile station 100 searches for the contracted network, after the power supply is turned on. The search may be performed, while including the Equivalent PLMN of the contracted network. The network, for which the contract has been established in the contracted country, may be searched for, only if there is no coverage of the PLMN which has already been manually selected at the time at which the power supply is turned on. After performing the selection of the network by the manual operation again, the search may be terminated by terminating the searching for the contracted network. The manual mode may be maintained, subsequent to the selection of the network, for which the contract has been established in the contracted country. Even if the network, for which the contract has been established in the contracted country, is not detected as a result of performing the search, the network may be selected, for which the contract has been established in the contracted country.

<Home Network Selection Method (Version 4)>

Subsequent to the selection of the network of a country other than the contracted country, when the coverage is lost in the country other than the contracted country, the mobile station 100 periodically searches for the contracted network. Here, the network of the country other than the contracted country is a network other than the network, for which the contract has been established in the contracted country. The network, for which the contract has been established in the contracted country, includes the home PLMN. When the contracted network is detected, the mobile station 100 automatically selects the contracted network. The search may be performed, while including the Equivalent PLMN of the contracted network. The manual mode may be maintained, subsequent to the selection of the network, for which the contract has been established in the contracted country. Even if the network, for which the contract has been established in the contracted country, is not detected as a result of performing the search, the network may be selected, for which the contract has been established in the contracted country.

<Home Network Selection Method (Version 5)>

When a network other than the contracted network is selected by the manual operation in the contracted country, the mobile station 100 may not perform the searching for the contracted network. However, when a network is selected by the manual operation in a country other then the contracted country, the mobile station 100 searches for the contracted network. When the contracted network is detected, the mobile station 100 automatically selects the contracted network. The network, for which the contract has been established in the contracted country, includes the home PLMN.

<Home Network Selection Method (Version 6)>

When a network is selected by the manual operation, the mobile station 100 may make reservation registration for any PLMNs which are not detected. Here, the any PLMNs include PLMNs in foreign countries or the like, which are currently not detected. Further, reservation selection may be made for a PLMN among the PLMNs for which the reservation registration is made. When the reservation selection has been made, the PLMN may be automatically selected, for which the reservation selection has been made, at a particular occasion, such as timing at which the power supply is turned on for the next time. For example, the reservation selection may be made by specifying date and time.

<Home Network Selection Method (Version 7)>

When the network is selected by the manual operation and the coverage is not detected after the power supply is turned on, or when the network is selected by the manual operation and the coverage is not detected for a constant time period, the mobile station 100 searches for any networks, which are not selected. For a case where the mobile station 100 is in the contracted country, the mobile station 100 automatically selects the contracted network, even if the network, for which the contract has been established in the contracted country, is not found among the detected PLMNs. The manual mode may be maintained, after selecting the contracted network in the contracted country.

<Functions of Mobile Station>

Figure 4:
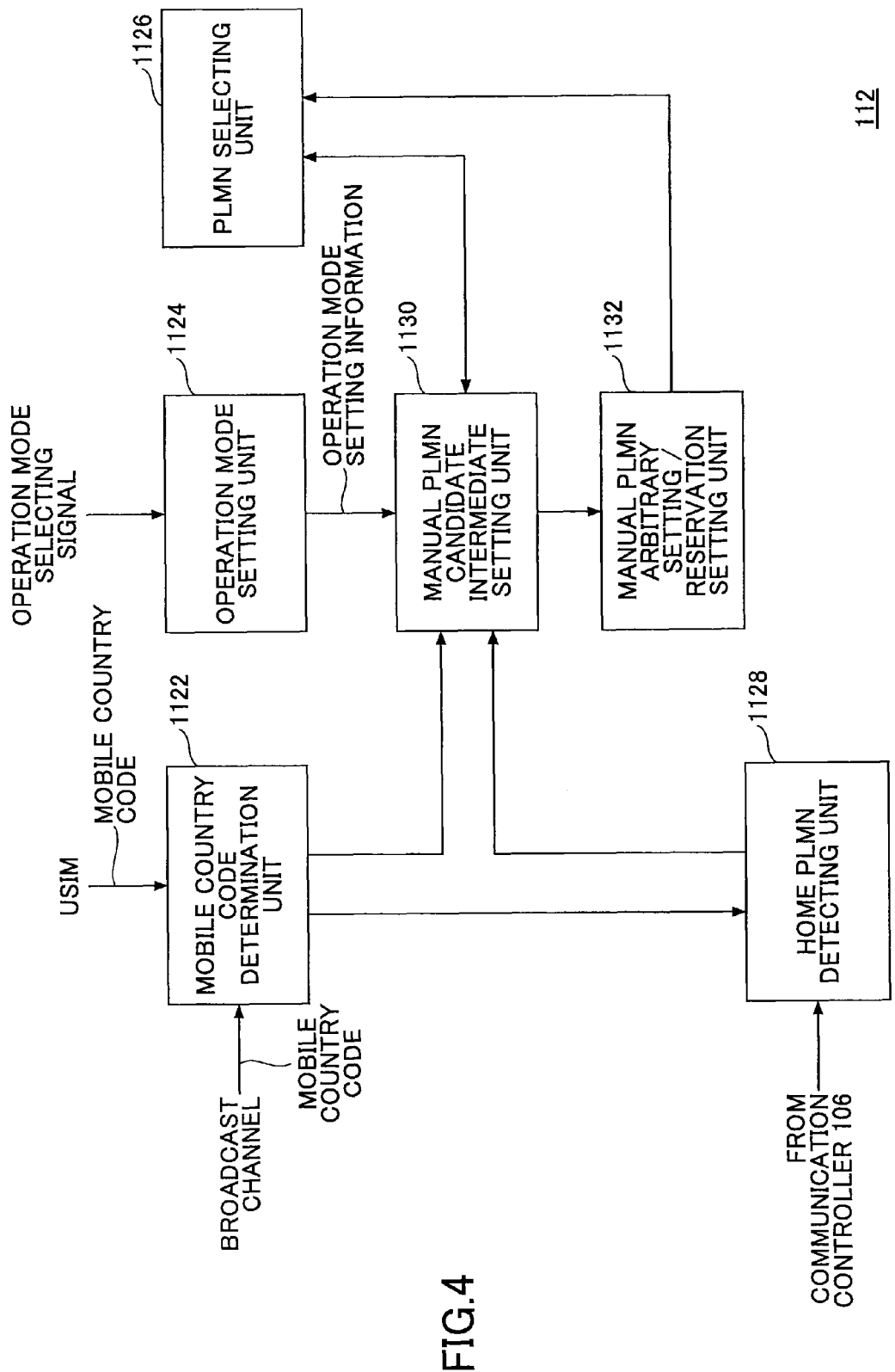
FIG. 4 is a functional block diagram showing the mobile station according to the embodiment.

FIG. 4 is a functional block diagram showing functions of the mobile station 100. FIG. 4 mainly indicates the functions performed by the central processing unit 112.

The mobile station 100 includes a mobile country code determination unit 1122. The mobile country code stored in the USIM card inserted into the mobile terminal 100 is input to the mobile country code determination unit 1122. The USIM card stores information representing the home Public Land Mobile Network (Home PLMN). Additionally, the USIM card may store information representing an Equivalent Public Land Mobile Network (Equivalent PLMN) corresponding to the home. Further, the mobile country code included in the broadcast channel received by the mobile station 100 is input to the mobile country code determination unit 1122. The mobile country code may be the mobile country code included in a master information block (MIB: Master Information Block) of the broadcast channel. The mobile country code determination unit 1122 determines whether the mobile country code stored in the USIM card coincides with the mobile country code included in the broadcast channel. The mobile country code determination unit 1122 inputs a determination result of whether the mobile country code stored in the USIM card coincides with the mobile country code included in the broadcast channel to a manual PLMN candidate intermediate setting unit 1130 and to a home PLMN detecting unit 1128.

The mobile station 100 includes an operation mode setting unit 1124. An operation mode selecting signal is input to the operation mode setting unit 1124. The operation mode selecting signal is input when the user selects the manual mode or the automatic mode. The operation mode setting unit 1124 sets an operation mode in accordance with the operation mode selecting signal. When the operation mode selecting signal is a signal indicating the automatic mode, the operation mode setting unit 1124 sets the operation mode to be the automatic mode. The operation mode setting unit 1124 reports to the manual PLMN candidate intermediate setting unit 1130 that the operation mode is set to be the automatic mode. When the operation mode selecting signal is a signal indicating the manual mode, the operation mode setting unit 1124 sets the operation mode to be the manual mode. The operation mode setting unit 1124 reports to the manual PLMN candidate intermediate setting unit 1130 that the operation mode is set to be the manual mode.

The mobile station 100 includes a PLMN selecting unit 1126. The manual PLMN candidate intermediate setting unit 1130 reports a Public Land Mobile Network (PLMN), which is input through a manual operation, to the PLMN selecting unit 1126. The PLMN selecting unit 1126 selects the PLMN reported from the manual PLMN candidate intermediate setting unit 1130. When the operation mode is set to be the manual mode by the operation mode setting unit 1124, the PLMN selecting unit 1126 may select the PLMN input from the manual PLMN candidate intermediate setting unit 1130.

When the operation mode is set to be the automatic mode by the operation mode setting unit 1124, the PLMN selecting unit 1126 may automatically selects a PLMN. For example, a network may be selected based on electric field strength.

The communication controller 106 inputs information indicating available frequency ranges and information representing cells which are to be connection candidates to the home PLMN detecting unit 1128.

When the operation mode setting unit 1124 sets the operation mode to be the manual mode, the home PLMN detecting unit 1128 detects the home PLMN. For example, the home PLMN detecting unit 1128 detects the home PLMN based on the information indicating the available frequency ranges and the information representing the cells to be the connection candidates from the communication controller 106. When the home PLMN is detected, the home PLMN detecting unit 1128 reports to the manual PLMN candidate intermediate setting unit 1130 that the home network is detected. The manual PLMN candidate intermediate setting unit 1130 reports to the PLMN selecting unit 1126 that the home PLMN is detected. In response to the report by the manual PLMN candidate intermediate setting unit 1130, the PLMN selecting unit 1126 selects the home PLMN.

The mobile station 100 includes the manual PLMN candidate intermediate setting unit 1130. The manual PLMN candidate intermediate setting unit 1130 is connected to the operation mode setting unit 1124. When the operation mode is set to be the manual mode based on operation mode setting information to be input by the operation mode setting unit 1124, the manual PLMN candidate intermediate setting unit 1130 sets candidates of the PLMN to be selected by the manual operation. The manual PLMN candidate intermediate setting unit 1130 inputs information representing the PLMN to the PLMN selecting unit 1126. The information representing the PLMN is input through the manual operation. When the manual PLMN candidate intermediate setting unit 1130 is reported that the home PLMN is detected, the manual PLMN candidate intermediate setting unit 1130 reports it to the PLMN selecting unit 1126.

The mobile station 100 includes a manual PLMN arbitrary setting/reservation setting unit 1132. The manual PLMN arbitrary setting/reservation setting unit 1132 is connected to the manual PLMN candidate intermediate setting unit 1130 and to the PLMN selecting unit 1126. The manual PLMN arbitrary setting/reservation setting unit 1132 registers PLMNs. The PLMNs that can be registered may include any PLMNs that are not detected yet. For example, PLMNs in foreign countries are included. Among the registered PLMNs, the manual PLMN arbitrary setting/reservation setting unit 1132 inputs information representing the PLMN for which reservation registration is made to the PLMN selecting unit 1126.

<Home Network Selection Method (Version 1)>

When a network is selected by a manual operation, the manual PLMN candidate intermediate setting unit 1130 inputs the PLMN which is specified by the manual operation among PLMNs, which are registered by the manual PLMN arbitrary setting/reservation setting unit 1132, to the PLMN selecting unit 1126. The PLMN selecting unit 1126 selects the PLMN which is specified by the manual operation. The manual PLMN arbitrary setting/reservation setting unit 1132 registers arbitrary PLMNs which are not detected yet. The arbitrary PLMNs which are not detected yet include PLMNs in foreign countries which are currently not detected.

<Home Network Selection Method (Version 2)>

When the power supply of the mobile station 100 is turned on, the home PLMN detecting unit 1128 searches for the network, for which the contract has been established in the contracted country. When the network, for which the contract has been established in the contracted country, is detected, the home PLMN detecting unit 1128 reports it to the manual PLMN candidate intermediate setting unit 1130. The manual PLMN candidate intermediate setting unit 1130 reports to the PLMN selecting unit 1126 that the contracted network is detected. The network, for which the contract has been established in the contracted country, includes the home PLMN. The PLMN selecting unit 1126 automatically selects the contracted network based on the report from the manual PLMN candidate intermediate setting unit 1130. However, when the PLMN which is not detected yet is manually selected during selection of the PLMN, the PLMN selecting unit 1126 may automatically cause the predetermined PLMN not to be manually selected. The search may be performed while including the Equivalent PLMN of the contracted network.

In a state where the operation mode is set to be the manual mode, subsequent to specifying and selecting a network in a country other than the contracted country (which is a network other than the network, for which the contract has been established in the contracted country) by the manual operation in the country other than the contracted country, when the coverage of the specified network is lost or the coverage of the specified network is found, after the power supply is turned on, the home PLMN detecting unit 1128 searches for the contracted network. When the contracted network is found, the home PLMN detecting unit 1128 reports it to the manual PLMN candidate intermediate setting unit 1130. The manual PLMN candidate intermediate setting unit 1130 reports to the PLMN selecting unit 1126 that the contracted network is found. The network, for which the contract has been established in the contracted country, includes the home PLMN. The PLMN selecting unit 1126 automatically selects the contracted network based on the report from the manual PLMN candidate intermediate setting unit 1130. When the contracted network is not found, the contracted network is not continuously searched for. On and after the manual network selection is performed again, the contracted network is not searched for.

<Home Network Selection Method (Version 4)>

In a state where the operation mode is set to be the manual mode, subsequent to specifying and selecting a network in a country other than the contracted country (which is a network other than the network, for which the contract has been established in the contracted country) by the manual operation in the country other than the contracted country, the home PLMN detecting unit 1128 periodically searches for the contracted network, after the coverage is lost. When the contracted network is found, the home PLMN detecting unit 1128 reports it to the manual PLMN candidate intermediate setting unit 1130. The manual PLMN candidate intermediate setting unit 1130 reports to the PLMN selecting unit 1126 that the contracted network is found. The network, for which the contract has been established in the contracted country, includes the home PLMN. The PLMN selecting unit 1126 automatically selects the contracted network based on the report from the manual PLMN candidate intermediate setting unit 1130. The search may be performed while including the Equivalent PLMN of the contracted network.

<Home Network Selection Method (Version 5)>

In a state where the operation mode is set to be the manual mode in the contracted country, when a network other than the contracted network is found by the manual operation, the home PLMN detecting unit 1128 does not search for the contracted network. However, when the home PLMN detecting unit 1128 detects the contracted network, after the network is selected by the manual operation in a country other than the contracted country, the home PLMN detecting unit 1128 searches for the contracted network, and reports it to the manual PLMN candidate intermediate setting unit 1130. The manual PLMN candidate intermediate setting unit 1130 reports to the PLMN selecting unit 1126 that the contracted network is found. The network, for which the contract has been established in the contracted country, includes the home PLMN. The PLMN selecting unit 1126 automatically selects the contracted network based on the report from the manual PLMN candidate intermediate setting unit 1130.

<Home Network Selection Method (Version 6)>

During selection of a network by the manual operation, reservation registration is made in advance for a PLMN which is not detected yet and which includes a PLMN in a foreign country which is not currently detected, among the PLMNs registered in the manual PLMN arbitrary setting/reservation setting unit 1132. The PLMN at the time of the reservation is not changed. For example, after the power supply is turned on, the PLMN selecting unit 1126 manually selects the reserved PLMN at a moment at which reservation designation is made. Until the moment at which the reservation designation is made, the current PLMN is continuously used.

<Home Network Selection Method (Version 7)>

When a network is selected by the manual operation and the coverage is lost after the power supply is turned on, or when the network is selected by the manual operation and the coverage is lost for a constant time period, the manual PLMN candidate intermediate setting unit 1130 searches for a network which is not selected. The PLMN selecting unit 1126 automatically selects the contracted network among the detected PLMNs. In the contracted country, the PLMN selecting unit 1126 automatically selects the contracted network, even if the contracted network is not found in the contracted country. After the contracted network is selected in the contracted country, the manual mode may be maintained.

<Operations of Mobile Station>

<Cell Search>

Figure 5:
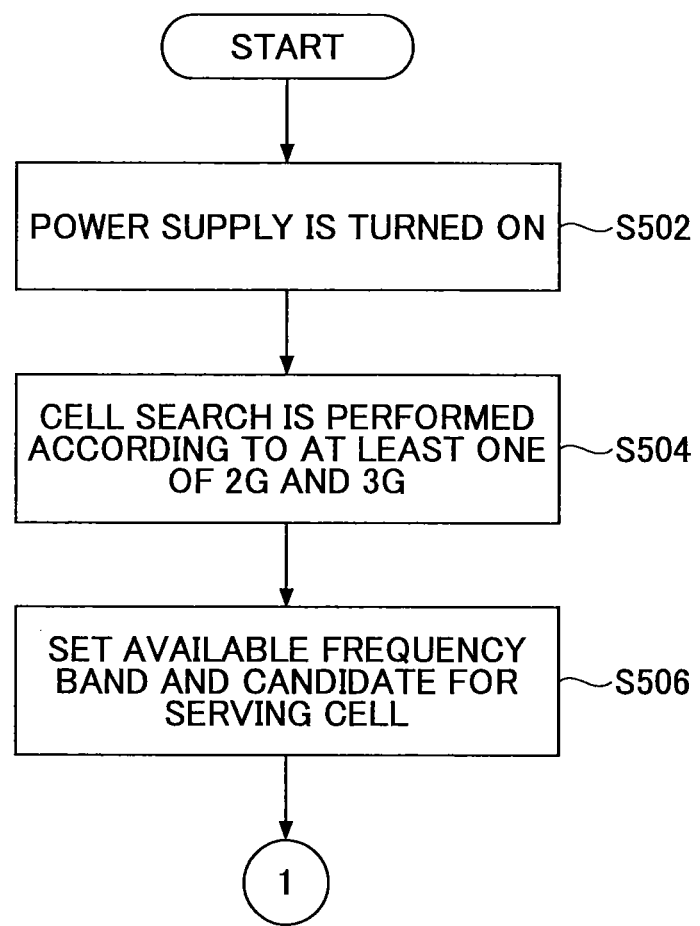
FIG. 5 is a flowchart showing an example of a cell search by the mobile station according to the embodiment.

FIG. 5 is a flowchart showing an example of operations the mobile station 100. FIG. 5 shows a cell search when the power supply is turned on.

The power supply of the mobile station 100 is turned on (step S502).

The mobile station 100 performs the cell search (step S504). For example, a frequency band and/or a frequency range of an operator of a country may be searched for. Here, the operator of the country is an operator which has served during the previous connection. During the cell search, the communication controller 106 searches for a frequency band and/or a frequency range which is to be set, and/or a radio access scheme. The radio access scheme which is used during the cell search may be a 2G scheme or a 3G scheme. Alternatively, it may be a radio access scheme based on LTE or the next generation of LTE. Since the probabilities of finding an available frequency range and a cell which can be a candidate of a destination of connection are large, a radio access scheme can be the radio access scheme which has been utilized for the previous radio connection.

The mobile station 100 sets the available frequency range and the cell which is to be a candidate for a serving cell, based on information indicating the available frequency range and information indicating the cell to be the candidate for the serving cell (step S506). The information indicating the available frequency range and the information indicating the cell to be the candidate for the serving cell are detected by the cell search.

<PLMN Selection Process (Version 1)>

Figure 6:
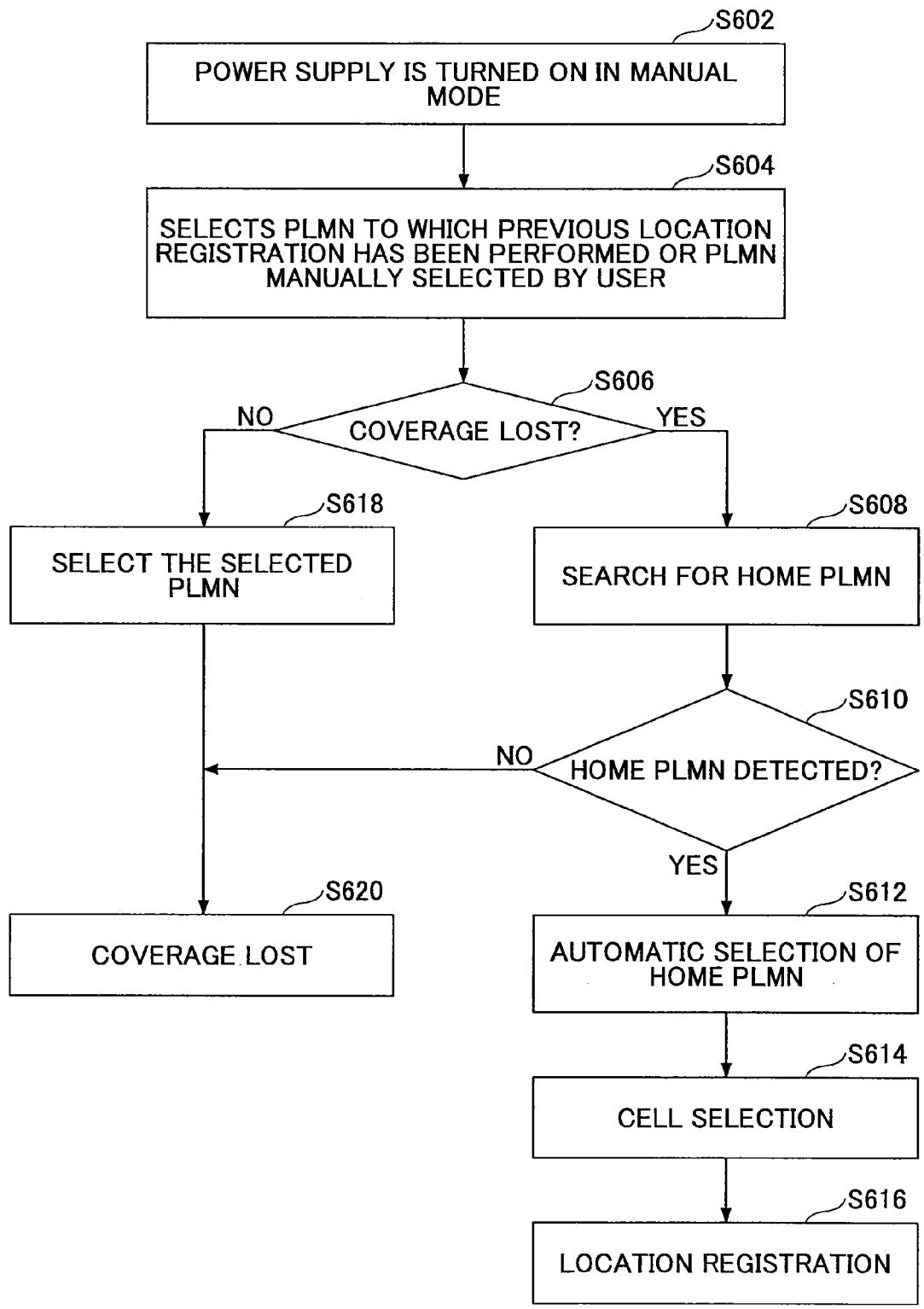
FIG. 6 is a flowchart showing an example (version 1) of operations of the mobile station according to the embodiment.

FIG. 6 shows an example of a process of selecting a PLMN by the mobile station 100.

The operation mode of the mobile station 100 is set to be the manual mode.

The power supply of the mobile station 100 is turned on (step S602).

The mobile station 100 selects a PLMN to which previous location registration has been performed or a PLMN which is manually selected by the user (step S604). For example, the PLMN selecting unit 1126 selects the PLMN to which previous location registration has been performed or the PLMN which is manually selected by the user.

The mobile station 100 determines whether the coverage is lost (step S606).

When the coverage is determined to be lost (step S606: YES), the mobile station 100 searches for the home PLMN (step S608). For example, the home PLMN detecting unit 1128 searches for the home PLMN.

The mobile station 100 determines whether the home PLMN is detected (step S610).

When the home PLMN is determined to be detected (step S610: YES), the mobile station 100 automatically selects the home PLMN (step S612). For example, the PLMN selecting unit 1126 automatically selects the home PLMN.

The mobile station 100 performs cell selection (step S614). For example, a candidate for an available cell is detected in broadcast information from a network selected at step S612.

The mobile station 100 performs location registration (step S616). For example, the location registration is performed with respect to the cell which is detected at step S614.

When step S606 determines that the coverage is not lost (step S606: NO), the mobile station 100 selects the selected PLMN (step S618).

Subsequent to selecting the PLMN at step S618, or when the home PLMN is not detected at step S610 (step S610: NO), the mobile station 100 determines that the coverage is lost (step S620).

<PLMN Selection Process (Version 2)>

Figure 7:
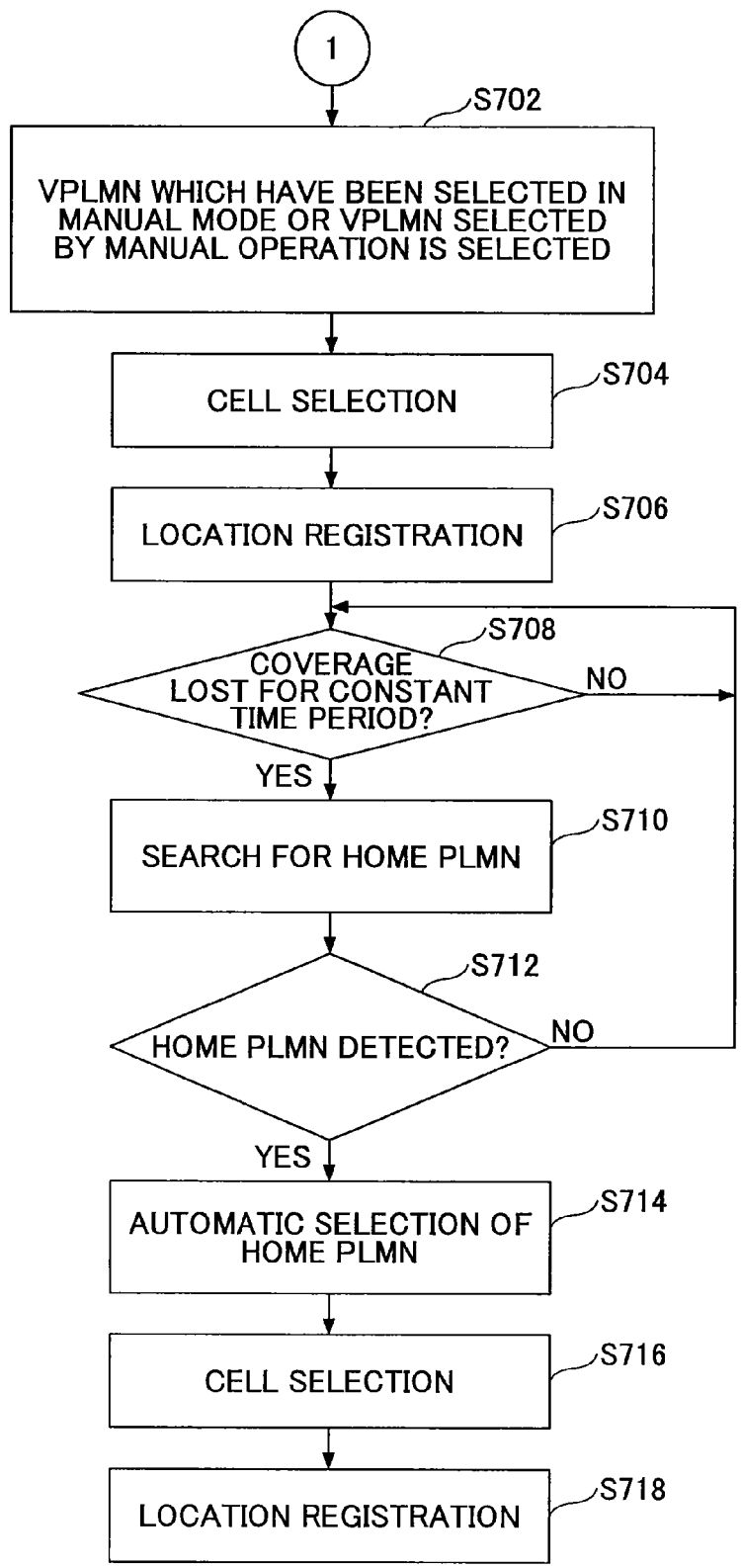
FIG. 7 is a flowchart showing an example (version 2) of operations of the mobile station according to the embodiment.

FIG. 7 shows an example of a process of selecting the PLMN by the mobile station 100.

The operation mode of the mobile station 100 is set to be the manual mode.

The mobile station 100 selects a visited PLMN (VPLMN: Visited PLMN) which has been selected by the manual mode or a visited PLMN which is selected by the manual mode (step S702). For example, the PLMN selecting unit 1126 selects a VPLMN.

The mobile station 100 performs cell selection (step S704). For example, a candidate for an available cell is detected in broadcast information from a network selected at step S702.

The mobile station 100 performs location registration (step S706). For example, the location registration is performed with respect to the cell which is detected at step S704.

The mobile station 100 looses the coverage of the cell to which the location registration is performed.

The mobile station 100 determines whether the coverage is lost for a constant time period (step S708). For example, the communication controller 106 determines whether the coverage is lost, based on a communication state with a serving base station. For example, the communication controller 106 determines whether the coverage is lost, based on quality of the communication with the serving base station. The mobile station 100 measures a time period of loosing the coverage, and determines whether the constant time period is elapsed since the coverage is lost.

When the coverage is determined not to be lost for the constant time period (step S708: NO), the process returns to step S708. The measurement of the time period of loosing the coverage is continued.

When the coverage is determined to be lost for the constant time period (step S708: YES), the mobile station 100 searches for the home PLMN (step S710). For example, when the communication controller 106 determines that the coverage is lost for the constant time period, the home PLMN detecting unit 1128 searches for the home PLMN. For example, the home PLMN detecting unit 1128 detects the home PLMN, based on information indicating the available frequency range and information indicating the cell which is to be a candidate for the serving cell. Here, the information indicating the available frequency range and the information indicating the cell which is to be a candidate for the serving cell are to be input by the communication controller 106.

The mobile station 100 determines whether the home PLMN is detected (step S712). For example, the home PLMN detecting unit 1128 determines whether the home PLMN is detected.

When the home PLMN is determined to be detected (step S712: YES), the mobile station 100 automatically selects the home PLMN (step S714). For example, when the home PLMN is detected, the home PLMN detecting unit 1128 reports it to the manual PLMN candidate intermediate setting unit 1130. The manual PLMN candidate intermediate setting unit 1130 reports to the PLMN selecting unit 1126 that the home PLMN is detected. In response to the report from the manual PLMN candidate intermediate setting unit 1130, the PLMN selecting unit 1126 selects the home PLMN.

Whereas, when the step S712 determines that the home PLMN is not detected (step S712: NO), the process returns to the step S708. Determination is made as to whether the coverage is lost for the constant time period. That is because there is a possibility of recovering the coverage.

The mobile station 100 performs cell selection (step S716). For example, a candidate for an available cell is detected in broadcast information from the home network selected at step S714.

The mobile station 100 performs location registration (step S718). For example, the location registration is performed with respect to the cell which is detected at step S716.

<PLMN Selection Process (Version 3)>

Figure 8:
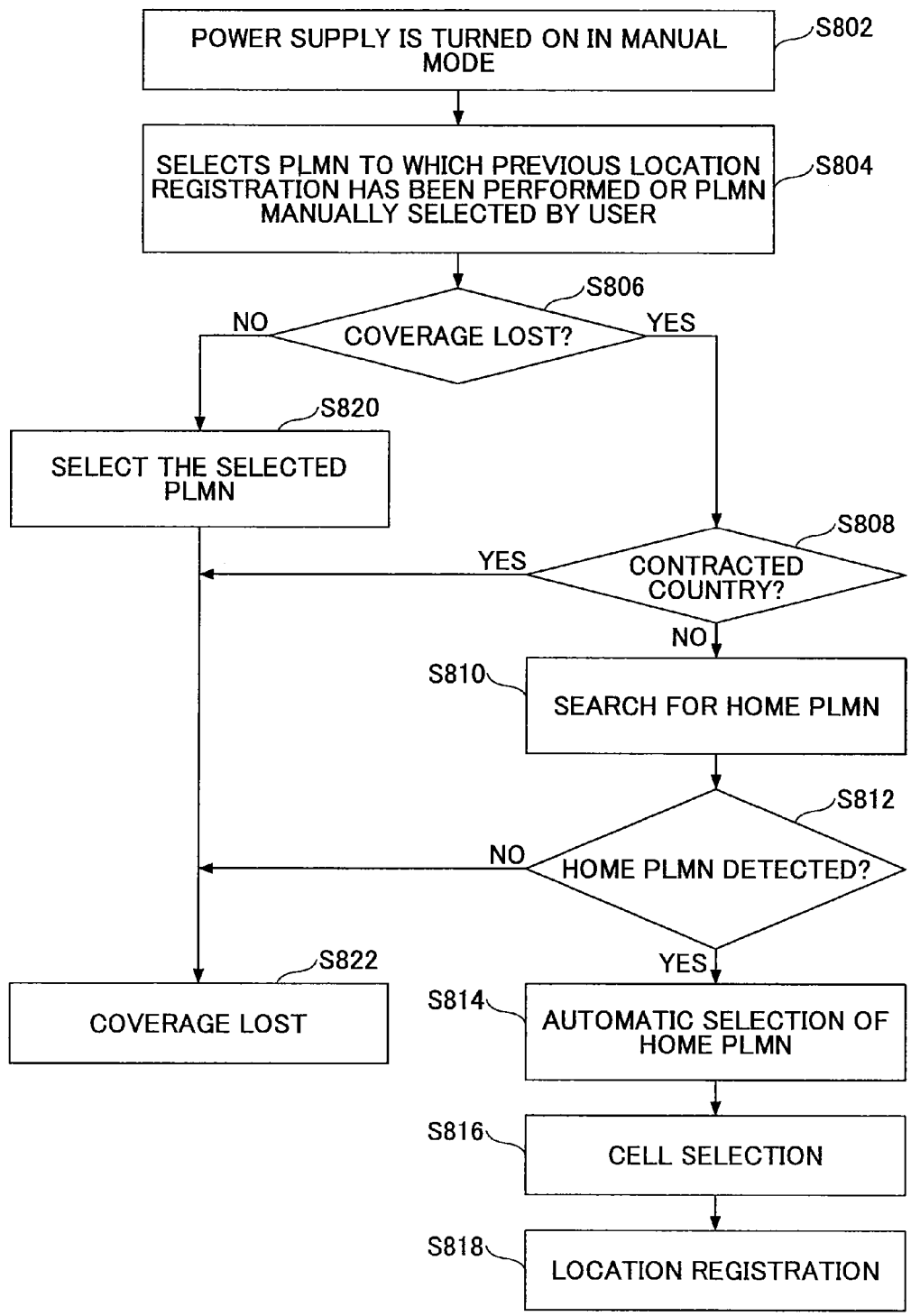
FIG. 8 is a flowchart showing an example (version 3) of operations of the mobile station according to the embodiment.

FIG. 8 shows an example of a process for selecting the PLMN by the mobile station 100.

The operation mode of the mobile station 100 is set to be the manual mode.

The power supply of the mobile station 100 is turned on (step S802).

The mobile station 100 selects the PLMN to which the previous location registration has been performed or the PLMN which is manually selected by the user (step S804). For example, the PLMN selecting unit 1126 selects the PLMN to which the previous location registration has been performed or the PLMN which is manually selected by the user.

The mobile station 100 determines whether the coverage is lost (step S806).

When the coverage is determined to be lost (step S806: YES), the mobile station 100 determines whether a country is the contracted country (step S808). For example, the mobile country code determination unit 1122 determines whether the country is the contracted country.

When the country is determined not to be the contracted country (step S808: NO), the mobile station 100 searches for the home PLMN (step S810). For example, the home PLMN detecting unit 1128 searches for the home PLMN.

The mobile station 100 determines whether the home PLMN is detected (step S812).

When the home PLMN is determined to be detected (step S812: YES), the mobile station automatically selects the home PLMN (step S814). For example, the PLMN selecting unit 1126 automatically selects the home PLMN.

The mobile station 100 performs cell selection (step S816). For example, a candidate for an available cell is detected in broadcast information from the network, which is selected at step S812.

The mobile station 100 performs location registration (step S818). For example, the location registration is performed with respect to the cell which is detected at step S816.

When step S806 determines that the coverage is not lost (step S806: NO), the mobile station 100 selects the selected PLMN (step S820).

Subsequent to the selection of the PLMN at step S820, when step S808 determines that a country is the contracted country (step S808: YES), or when the home PLMN is not detected at step S812 (step S812: NO), the mobile station determines that the coverage is lost (step S822).

<PLMN Selection Process (Version 4)>

Figure 9:
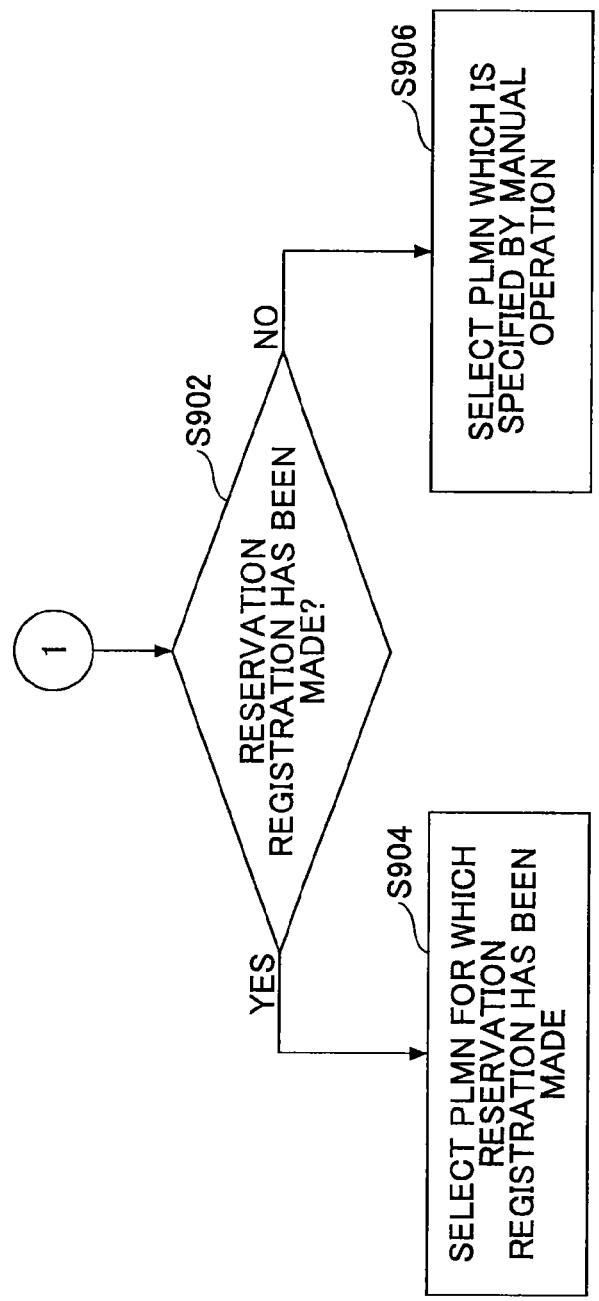
FIG. 9 is a flowchart showing an example (version 4) of operations of the mobile station according to the embodiment.

FIG. 9 shows an example of a process of selecting a PLMN by the mobile station 100.

The operation mode of the mobile station is set to be the manual mode.

The mobile station 100 determines whether reservation registration has been made (step S902). For example, the manual PLMN arbitrary setting/reservation setting unit 1132 determines whether a reservation of a PLMN, which is included in the registered PLMNs, has been made.

When it is determined that the reservation registration has been made (step S902: YES), the mobile station 100 selects the PLMN for which the reservation registration has been made at a specified timing (step S904). For example, the PLMN selecting unit 1126 automatically selects the PLMN, for which the reservation registration has been made. Prior to the specified timing, no change is made.

When it is determined that no reservation registration has been made (step S902: NO), the mobile station 100 selects the PLMN, which is specified by the manual operation (step S906). When the PLMN is to be selected by the manual operation, a PLMN, which is not detected, may be registered.

The mobile station includes a PLMN registration unit as the manual PLMN arbitrary setting/reservation setting unit that registers PLMNs including a PLMN, which is input by a manual operation and which is not detected; a PLMN selecting unit that selects a PLMN which is specified by the manual operation, among the PLMNs registered in the PLMN registration unit, wherein the PLMNs include the PLMN, which is not detected.

Further, when a different PLMN other than a predetermined PLMN is selected by the manual operation, and the PLMN, which is not detected, is specified by the manual operation, the PLMN selecting unit may automatically select the predetermined PLMN.

A mobile station is a mobile station that detects a predetermined PLMN, when a different PLMN other than the predetermined PLMN is selected by a manual operation. The mobile station includes a PLMN detecting unit as the home PLMN detecting unit that detects, when a power supply is turned on, the predetermined PLMN, prior to specifying a PLMN by the manual operation; and a PLMN selecting unit that automatically selects the predetermined PLMN, which is detected by the PLMN detecting unit.

A mobile station is a mobile station that detects a predetermined PLMN, when a different PLMN other than the predetermined PLMN is selected by a manual operation. The mobile station includes a PLMN detecting unit as the home PLMN detecting unit that periodically detects the predetermined PLMN, when coverage is lost; and a PLMN selecting unit that automatically selects the predetermined PLMN, which is detected by the PLMN detecting unit.

A mobile station is a mobile station that detects a predetermined PLMN, when a different PLMN other than the predetermined PLMN is selected by a manual operation. The mobile station includes a PLMN detecting unit as the home PLMN detecting unit that detects the predetermined PLMN, when the different PLMN other than the predetermined PLMN is selected by the manual operation in a first country other than a second country corresponding to the predetermined PLMN; and the PLMN selecting unit that automatically selects the predetermined PLMN, which is detected by the PLMN detecting unit.

Further, a reservation registration unit as the manual PLMN arbitrary setting/reservation setting unit that reserves a PLMN to be specified by the manual operation among the PLMNs registered in the PLMN registration unit may be included. The PLMN selecting unit may select the PLMN reserved by the reservation registration unit.

A mobile station includes a PLMN detecting unit that detects a specific PLMN which is not detected, when a PLMN is selected by a manual operation; and a PLMN selecting unit that automatically selects the PLMN detected by the PLMN detecting unit.

Further, a mobile country code determination unit that identifies, when a power supply is turned on, whether a country is a contracted country corresponding to a predetermined contracted PLMN may be included. The mobile country code selecting unit may automatically select the specific PLMN, which is not detected in the contracted country.

A method includes a PLMN registration step of registering PLMNs including a PLMN, which is input by a manual operation and which is not detected; and a PLMN selecting step of selecting a PLMN specified by the manual operation, among the PLMNs including the PLMN not being detected. Here, the PLMNs including the PLMN not being detected are registered by the PLMN registration step.

A method is a method of a mobile station that detects a predetermined PLMN, when a different PLMN other than the predetermined PLMN is selected by a manual operation. The method includes a PLMN detecting step of detecting, when a power supply is turned on, the predetermined PLMN, prior to specifying a PLMN by the manual operation; and a PLMN selecting step of automatically selecting the predetermined PLMN detected by the PLMN detecting step.

A method is a method of a mobile station that detects a predetermined PLMN, when a different PLMN other than the predetermined PLMN is selected by a manual operation. The method includes a PLMN detecting step of periodically detecting, when coverage is lost, the predetermined PLMN; and a PLMN selecting step of automatically selecting the predetermined PLMN detected by the PLMN detecting step.

A method is a method of a mobile station that detects a predetermined PLMN, when a different PLMN other than the predetermined PLMN is selected by a manual operation. The method includes a PLMN detecting step of detecting the predetermined PLMN, when the different PLMN other than the predetermined PLMN is selected by the manual operation in a first country other than a second country corresponding to the predetermined PLMN; and a PLMN selecting step of automatically selecting the predetermined PLMN detected by the PLMN detecting step.

A method includes a PLMN detecting step of detecting a specific PLMN which is not detected, when a PLMN is selected by a manual operation; and a PLMN selecting step of automatically selecting the PLMN detected by the PLMN detecting step.

For convenience of explanation, specific examples of numerical values are used in order to facilitate understanding of the invention. However, these numerical values are simply illustrative, and any other appropriate values may be used, except as indicated otherwise.

Hereinabove, the present invention is explained by referring the specific embodiments. However, the embodiments are merely illustrative, and variations, modifications, alterations and substitutions could be conceived by those skilled in the art. For the convenience of explanation, the devices according to the embodiments of the present invention are explained by using functional block diagrams. However, these devices may be implemented in hardware, software, or combinations thereof. The present invention is not limited to the above-described embodiments, and various variations, modifications, alterations, substitutions and so on are included, without departing from the spirit of the present invention.

The present international application claims priority based on Japanese Patent Application No. 2010-254877, filed on Nov. 15, 2010, the entire contents of Japanese Patent Application No. 2010-254877 are hereby incorporated by reference.

LIST OF REFERENCE SYMBOLS

100: Mobile station
102: Input unit
104: Output unit
106: Communication controller
108: Radio unit
110: Storing unit
112: Central processing unit (CPU: Central Processing Unit)
1122: Mobile country code determination unit
1124: Operation mode setting unit
1126: PLMN selecting unit
1128: Home PLMN detecting unit
1130: Manual PLMN candidate intermediate setting unit
1132: Manual PLMN arbitrary setting unit/reservation setting unit
$200_m$ (m is an integer such that m>0): Base station

The invention claimed is:

1. A mobile station comprising:
a public land mobile network registration storage memory configured to store information about public land mobile networks including a public land mobile network selected by a manual operation, wherein the public land mobile network selected by the manual operation is to be detected; and
circuitry configured to
select the public land mobile network selected by the manual operation for location registration, among the information about the public land mobile networks stored in the public land mobile network registration storage memory, and
allow a user to manually reserve one of the public land mobile networks, the information about the public land mobile networks being stored in the public land mobile network registration storage memory, so that the reserved public mobile network is selected at a specified date and time.

2. The mobile station according to claim 1,
wherein, when the public land mobile network other than a predetermined public land mobile network is selected by the manual operation, and when the public land mobile network that is to be detected is specified by the manual operation, the circuitry avoids automatically selecting the predetermined public land mobile network.

3. A mobile station configured to detect a predetermined public land mobile network, when a public land mobile network other than the predetermined public land mobile network is selected by a manual operation, the mobile station comprising:
a public land mobile network registration storage memory configured to store information about public land mobile networks including the public land mobile network selected by the manual operation, wherein the public land mobile network selected by the manual operation is to be detected; and
circuitry configured to
detect, when a power supply is turned on, the predetermined public land mobile network, prior to specifying the public land mobile network by the manual operation,
automatically select the detected predetermined public land mobile network, and
allow a user to manually reserve one of the public land mobile networks, the information about the public land mobile networks being stored in the public land mobile network registration storage memory, so that the reserved public mobile network is selected at a specified date and time.

4. A mobile station configured to detect a predetermined public land mobile network, when a public land mobile network other than the predetermined public land mobile network is selected by a manual operation, the mobile station comprising:
a public land mobile network registration storage memory configured to store information about public land mobile networks including the public land mobile network selected by the manual operation, wherein the public land mobile network selected by the manual operation is to be detected; and
circuitry configured to
periodically detect the predetermined public land mobile network, when coverage is lost,
automatically select the detected predetermined public land mobile network, and
allow a user to manually reserve one of the public land mobile networks, the information about the public land mobile networks being registered in the public land mobile network registration memory, so that the reserved public mobile network is selected at a specified date and time.

5. A mobile station configured to detect a predetermined public land mobile network, when a public land mobile network other than the predetermined public land mobile network is selected by a manual operation, the mobile station comprising:
a public land mobile network registration storage memory configured to store information about public land mobile networks including a public land mobile network selected by the manual operation, wherein the public land mobile network selected by the manual operation is to be detected; and circuitry configured to detect the predetermined public land mobile network, when the public land mobile network other than the predetermined public land mobile network is selected by the manual operation in a first country other than a second country corresponding to the predetermined public land mobile network, automatically select the detected predetermined public land mobile network, and allow a user to manually reserve one of the public land mobile networks, the information about the public land mobile networks being stored in the public land mobile network registration storage memory, so that the reserved public mobile network is selected at a specified date and time.

6. A mobile station comprising:

a public land mobile network registration storage memory configured to store information about public land mobile networks including a public land mobile network selected by a manual operation, wherein the public land mobile network selected by the manual operation is to be detected; and circuitry configured to detect a specific public land mobile network, wherein the specific public land mobile network is not detected at a moment at which the public land mobile network is selected by the manual operation, automatically select the detected specific public land mobile network, and allow a user to manually reserve one of the public land mobile networks, the information about the public land mobile networks being registered in the public land mobile network registration storage memory, so that the reserved public mobile network is selected at a specified date and time.

7. The mobile station according to claim 6, wherein the circuitry is further configured to identify, when a power supply is turned on, whether a country is a contracted country corresponding to a predetermined contracted public land mobile network, and automatically select the specific public land mobile network, the specific public land mobile network which is not detected in the contracted country.

8. A method of a mobile station comprising:

storing information about public land mobile networks including a public land mobile network selected by a manual operation, wherein the public land mobile network selected by the manual operation is to be detected;

selecting, by circuitry of the mobile station, the public land mobile network selected by the manual operation for location registration, among the public land mobile networks; and receiving from a user a manual reservation selection of one of the public land mobile networks, so that the reserved public mobile network is selected at a specified date and time.

9. A method of a mobile station for detecting a predetermined public land mobile network, when a public land mobile network other than the predetermined public land mobile network is selected by a manual operation, the method comprising:

storing information about public land mobile networks including the public land mobile network selected by the manual operation, wherein the public land mobile network selected by the manual operation is to be detected;

detecting by circuitry of the mobile station, when a power supply is turned on, the predetermined public land mobile network, prior to specifying the public land mobile network by the manual operation;

automatically selecting, by the circuitry, the predetermined public land mobile network detected by the step of detecting; and receiving from a user a manual reservation selection of one of the public mobile networks, so that the reserved public mobile network is selected at a specified date and time.

10. A method of a mobile station for detecting a predetermined public land mobile network, when a public land mobile network other than the predetermined public land mobile network is selected by a manual operation, the method comprising:

storing information about public land mobile networks including the public land mobile network selected by the manual operation, wherein the public land mobile network selected by the manual operation is to be detected;

periodically detecting by circuitry of the mobile station, when coverage is lost, the predetermined public land mobile network;

automatically selecting, by the circuitry, the predetermined public land mobile network detected by the step of detecting.

11. A method of a mobile station for detecting a predetermined public land mobile network, when a public land mobile network other than the predetermined public land mobile network is selected by a manual operation, the method comprising:

storing information about public land mobile networks including the public land mobile network selected by the manual operation, wherein the public land mobile network selected by the manual operation is to be detected;

detecting, by circuitry of the mobile station, the predetermined public land mobile network, when the public land mobile network other than the predetermined public land mobile network is selected by the manual operation in a first country other than a second country corresponding to the predetermined public land mobile network;

automatically selecting, by the circuitry, the predetermined public land mobile network detected by the step of detecting; and receiving from a user a manual reservation selection of one of the public mobile networks, so that the reserved public mobile network is selected at a specified date and time.

12. A method of a mobile station comprising:

storing information about public land mobile networks including a public land mobile network selected by a manual operation, wherein the public land mobile network selected by the manual operation is to be detected;

detecting, by circuitry of the mobile station, a specific public land mobile network, wherein the specific public land mobile network is not detected at a moment at which the public land mobile network is selected by the manual operation;

automatically selecting the specific public land mobile network detected by the step of detecting; and receiving from a user a manual reservation selection of one of the public mobile networks, the information about the public land mobile networks being stored in the step of storing, so that the reserved public mobile network is selected at a specified date and time.

* * * * *